(12) United States Patent
Lee et al.

(10) Patent No.: US 6,355,326 B1
(45) Date of Patent: Mar. 12, 2002

(54) PHASE CHANGE OPTICAL DISK

(75) Inventors: Jae-Won Lee; Jung-Ki Jun, both of Seoul (KR)

(73) Assignee: SKC Limited, Kyungki-do (KR)

( * ) Notice: Subject to any disclaimer, the term of this patent is extended or adjusted under 35 U.S.C. 154(b) by 0 days.

(21) Appl. No.: 09/406,985

(22) Filed: Sep. 28, 1999

(30) Foreign Application Priority Data

Sep. 30, 1998 (KR) .............................................. 98-41082
Nov. 20, 1998 (KR) .............................................. 98-49920
Jun. 2, 1999 (KR) .............................................. 99-20151

(51) Int. Cl.$^7$ ................................................ B32B 3/02
(52) U.S. Cl. ..................... 428/64.1; 428/64.5; 428/64.6; 428/457; 428/913; 430/270.13; 369/288
(58) Field of Search ................................ 428/64.1, 64.2, 428/64.4, 64.5, 64.6, 457, 913; 430/270.13, 495.1, 945; 369/283, 288

(56) References Cited

U.S. PATENT DOCUMENTS

| 5,439,752 A | * | 8/1995 | Yoshiko ..................... 428/623 |
| 6,042,921 A | * | 3/2000 | Yoshinari .................. 428/64.1 |
| 6,177,166 B1 | * | 1/2001 | Ohno ........................ 428/64.1 |

\* cited by examiner

*Primary Examiner*—Elizabeth Evans
(74) *Attorney, Agent, or Firm*—Roseman & Colin, LLP

(57) ABSTRACT

A phase change optical disk having excellent corrosion resistance, recording signal properties and overwrite cyclability, which contains a first dielectric layer, a recording layer, a second dielectric layer, a reflection layer and a protection layer, characterized in that the reflection layer comprises a first reflection layer made of a metal or an alloy thereof having an electronegativity ranging from 1.9 to 3.0 and a second reflection layer made of Cu, Ag or an alloy thereof, said first reflection layer being in closed contact with the second dielectric layer, and the second reflection layer, with the first reflection layer and the protection layer.

9 Claims, 9 Drawing Sheets

PHASE CHANGE OPTICAL DISK

FIELD OF THE INVENTION

The present invention is directed to a phase change optical disk; and, more particularly, to a rewritable phase change optical disk comprising a double-layered reflection layer and having an excellent corrosion resistance, cyclability and signal fidelity.

BACKGROUND OF THE INVENTION

Figure 1:
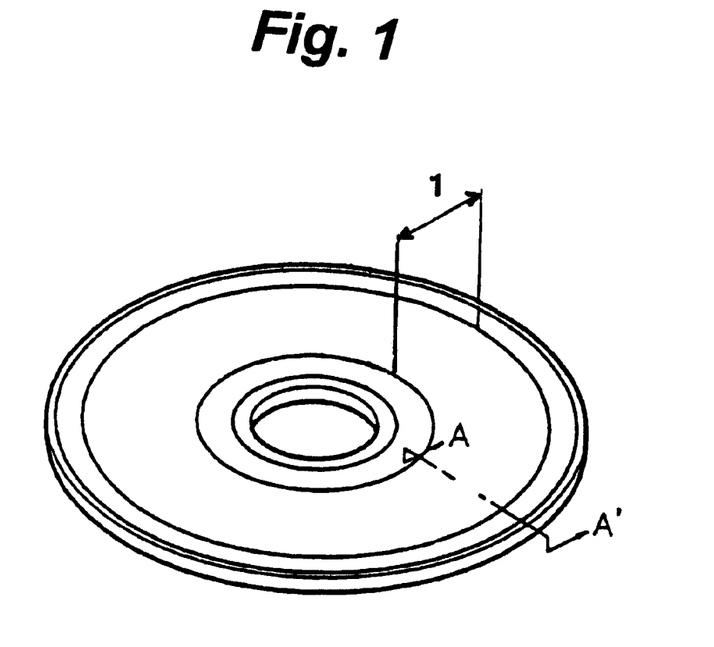
FIG. 1 shows a schematic diagram of a conventional optical disk.
Figure 2:
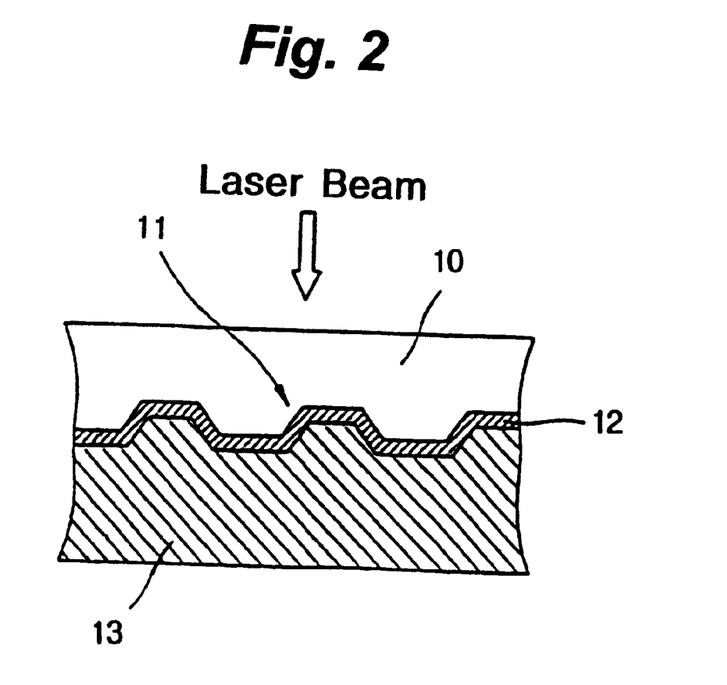
FIG. 2 represents an enlarged sectional view of FIG. 1 taken along the line A–A'.

An optical disk generally has the structure shown in FIG. 1, and in the information recording area (1), digital information forming pits(11) are formed on the track of a substrate(10). A reflection layer(12) and a protection layer (13) are then sequentially formed thereon, as shown in FIG. 2.

With the advent of CD-ROMs, there have been increasing demands for rewritable recording media that can effectively accommodate multi-media related software such as video images, still images and animations. As a result, there have been developed CD-RWs(compact disks-rewritable) which can be recorded and erased repeatedly. The CD-RWs include magneto optical type disks, phase change type optical disks, and the like. A phase change optical disk makes use of a recording material which is capable of undergoing a phase change between crystalline and amorphous phases in response to light, e.g., a laser beam, and this type of optical disk is compatible with the information reading mechanism used in conjunction with conventional CDs.

Figure 3:
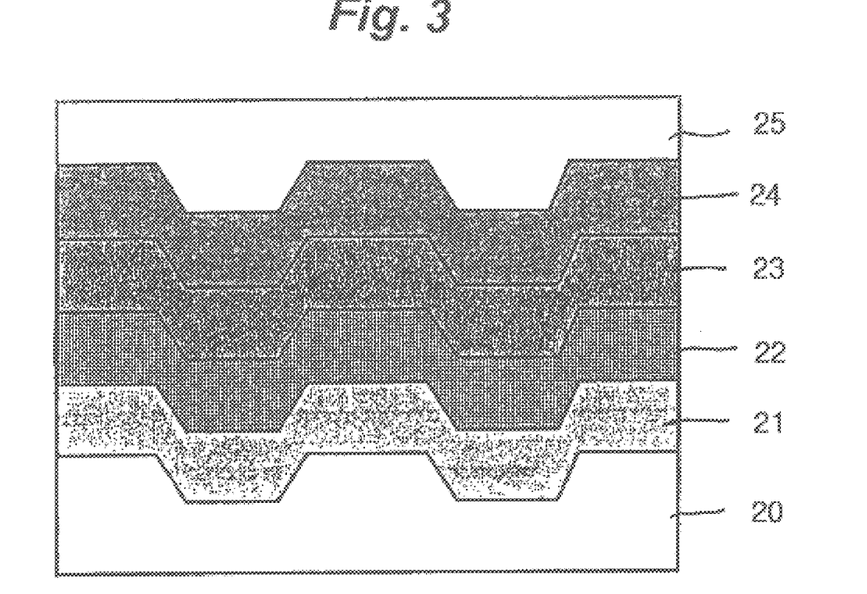
FIG. 3 depicts a schematic diagram illustrating the layered structure of a conventional phase change optical disk.

In a phase change disk, information can be recorded on or erased off a recording layer by way of interconverting the phase of the recording pits between crystallin/amorphous phases with a controlled laser beam irradiation. As shown in FIG. 3, a conventional phase change disk has a first dielectric layer(21), a recording layer(22), a second dielectric layer(23), a reflection layer(24) and a protection layer(25), which are sequentially formed on a transparent substrate (20). The tracks in the recording layer contain recorded signals formed thereon when a laser beam is irradiated so as to convert the phase of a specific area of the recording layer from crystalline to amorphous state, or vise versa.

This type of phase change optical disk, with which a short-wavelength laser beam and a single optical system can be employed, is applicable to next generation high density rewritable optical disk such as DVD-RAMs(digital video disk random access memory).

In conventional phase change optical disks, an Al alloy or Ag is used in forming a relatively thick reflection layer having limited performance characteristics. The use of a reflection layer made of a thin Al alloy film, however, may lead to a disk having unsatisfactory recording properties, and a reflection layer made of a thin Ag film tends to exhibit poor corrosion resistance.

Therefore, there has existed a need to develop a phase change optical disk comprising a thin reflection layer which is corrosion resistant and possessed with improved recording properties.

SUMMARY OF THE INVENTION

Accordingly, it is a primary object of the present invention to provide a phase change optical disk having excellent recording properties as well as corrosion resistance.

In accordance with the present invention, there is provided a phase change optical disk having a first dielectric layer, a recording layer, a second dielectric layer, a reflection layer and a protection layer, characterized in that the reflection layer comprises a first reflection layer made of a metal or an alloy thereof having an electronegativity ranging from 1.9 to 3.0 and a second reflection layer made of Cu, Ag or an alloy thereof, the first reflection layer being in closed contact with the second dielectric layer, and the second reflection layer, with the first reflection layer and the protection layer.

BRIEF DESCRIPTION OF THE DRAWINGS

The above and other objects and features of the present invention will become apparent from the following description thereof, when taken in conjunction with the accompanying drawings wherein.

DETAILED DESCRIPTION OF THE INVENTION

Figure 4:
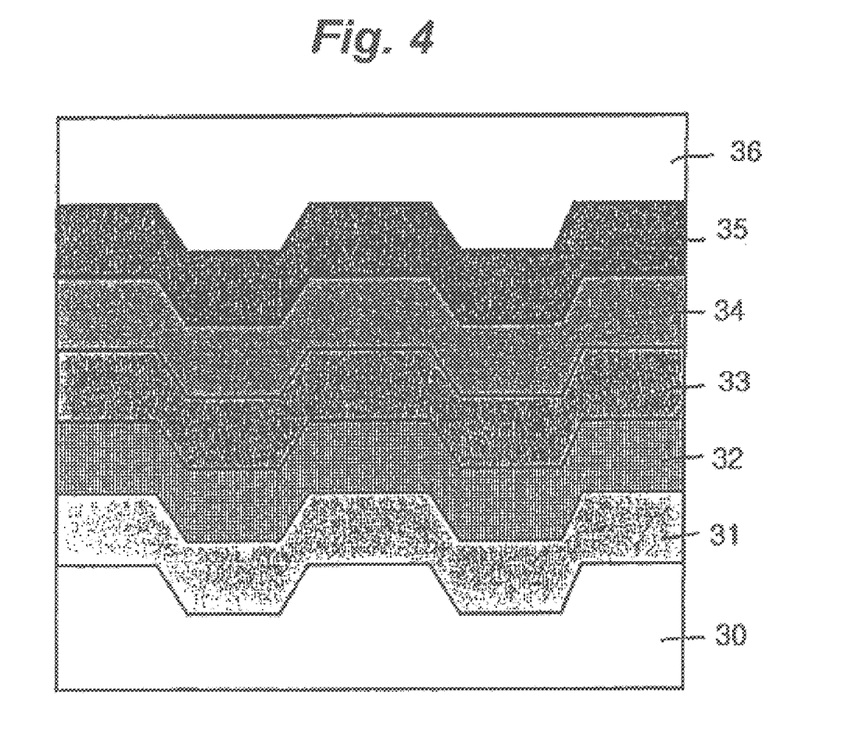
FIG. 4 presents a schematic diagram of the inventive phase change optical disk in accordance with one embodiment of the present invention.

Referring to FIG. 4, the phase change optical disk in accordance with one embodiment of the present invention comprises a first dielectric layer(31), a recording layer(32), a second dielectric layer(33), a first reflection layer(34), a second reflection layer(35) and a protection layer, which are sequentially formed on a transparent substrate(30), in that order.

The substrate which can be used in the present invention is prepared by a conventional injection molding method employing a polycarbonate resin. The width and depth of the grooves formed on the substrate are designed taking into consideration the servo characteristics which affect the recording and playing properties of the disk. Especially, when both the lands and grooves are used in recording to obtain a high density disk, the depth of the grooves should be set at $\lambda/5n - \lambda/7n$ ($\lambda$=wavelength of recording/playing light, n=refractive index of a polycarbonate substrate) in order to prevent the cross talk phenomenon.

The dielectric layer of an optical disk should be optically transparent and heat resistant. The dielectric material which can be used in forming the dielectric layer of the inventive disk preferably has high heat stability, and an optical absorption coefficient close to 0. Examples thereof include metal oxides, metal carbonate, metal nitrides or a mixture thereof. Specific examples of dielectric material which can be used in present invention include $ZnS$—$SiO_2$(8:2), AlN and GeN. The first and second dielectric layers of the present invention may be formed by using an RF(radio-frequency) sputtering method in a thickness of 300 to 3000 Å for the first dielectric layer and 50 to 500 Å for the second dielectric layer.

Used in forming the recording layer of the present invention is a material which can easily undergo a phase change between crystalline and amorphous phases in response to laser beam irradiation, and examples thereof include conventional calcogen compounds such as Ge—Sb—Te, In—Sb—Te, Ag—In—Sb—Te, Cr—Ge—Sb—Te and N—Ge—Sb—Te alloys. These materials can be used with other additives to improve the recording layer characteristics. The recording layer can be formed by using a conventional method such as DC(direct current) sputtering in a thickness ranging from 100 to 1000 Å.

For forming a reflection layer, conventional metals such as Al, Ag, Au, Cu can be used. In order to improve the recording and oxidation-resistant properties, a small amount of other metal such as Cr, Ni, Ti, Si, Mg may be added thereto to form an alloy such as Al—Ti(Ti 1.5 wt %), Al—Cr(Cr 2 at %), Ag—Al and Ag—Mg.

In the inventive optical disk, the material that may be used in forming the first reflection layer is a metal or an alloy thereof which have an electronegativity ranging from 1.9 to 3.0 and does not react with the dielectric layer. The second reflecting material may be formed using a metal or an alloy, e.g., Cu, Ag or an alloy thereof, which has a higher thermal conductivity than the first reflection layer and may contain a metallic component selected from the group consisting of Al, Au, Cu, Ag, W, Mo, Ni, Ge, Si, Fe, Cr, Co, Zr, Zn, Ti, Ta, Mg, Pd, V, Nb, Hf, Sn, Sc, Rh, Pt, Mn and a combination thereof as a minor component.

Exemplary metals for forming the first reflection layer include Al, Au, W, Mo, Ni, Ge, Si, Pd, Sn, Rh, Pt and an alloy thereof which may contain Al, Au, Cu, Ag, W, Mo, Ni, Ge, Si, Fe, Cr, Co, Zr, Zn, Ti, Ta, Mg, Pd, V, Nb, Hf, Sn, Sc, Rh, Pt, Mn or a combination thereof as a minor component.

Generally, it is required that the reflection layer be capable of rapidly cooling a molten mark, which is generated in the recording layer by the heating action of laser beam irradiation to a temperature higher than the melting point of the recording material, so that an amorphous recording mark is formed thereon, and at the same time, be capable of crystallizing an amorphous recording mark by way of maintaining the mark at a preset constant temperature for a time sufficient to allow the crystallization thereof during an erase cycle. When an Al alloy is used in the reflection layer, signal properties tend to deteriorate with repeated recording/erasing cycles due to an excessive heat load that builds up on the reflection layer. In order to overcome such a problem, the use of Ag and Cu has been suggested, but a reflection layer made of Ag or Cu exhibits poor erase characteristics due to its excessively high heat conductivity and also to its tendency to react with the second dielectric layer.

In the present invention, the first reflection layer, which is in close contact with the second dielectric layer, functions to maintain the temperature of the recording layer at a desirable range during a crystallization cycle and also plays the role of preventing the reaction between the second reflection layer and the dielectric layer. Further, the second reflection layer, which is positioned between the first reflection layer and the protection layer, has a higher thermal conductivity and alleviates the build up of an excessive heat load on the first reflection layer.

The thickness of the first and second reflection layers may be suitably determined depending on materials used in forming the first and second reflection layers, the composition of the recording layer, recording speed, and the composition and thickness of the dielectric layers. For example, when the first reflection layer is made of W, Si or an Al alloy, and the second reflection layer is formed from Cu, Ag or an Ag alloy, the first reflection layer preferably has a thickness of 10 Å or more, more preferably 100 Å or more, and the second reflection layer, a thickness of 250 Å or more, more preferably 450 Å or more.

Further, when a first reflection layer made of an Al alloy and a second reflection layer formed from Cu or Ag are employed in a disk designed for a DVD-RAM, the first reflection layer preferably has a thickness of 1300 Å or more and the second reflection layer preferably has a thickness of 10 Å or more, more preferably, 10 Å to 800 Å, while the combined thickness of the first and second reflection layers preferably do not exceed 2000 Å.

In order to attain suitable signal modulation characteristics, it is preferred that the disk is prepared such that the difference in the reflectivity between the amorphous and crystalline phases of the recording layer is more than 10%. Further, when both the land and groove regions of the disk are used in recording, the signal amplitude tends to decrease due to interference induced by the signal phase difference, which is generated by the difference in refractive index between the recorded amorphous marks and erased crystalline marks. In order to prevent such a problem it is desirable to make the reflectivity of the amorphous phase close to 0, or to design the thickness of each layer so as to minimize the signal amplitude difference between the groove and land.

Further, in order to reduce the manufacturing cost, it is preferable that the thickness of each layer is kept at an allowable lower limit.

A conventional UV-curable resin may be used in the protection layer of the inventive disk.

Figure 5:
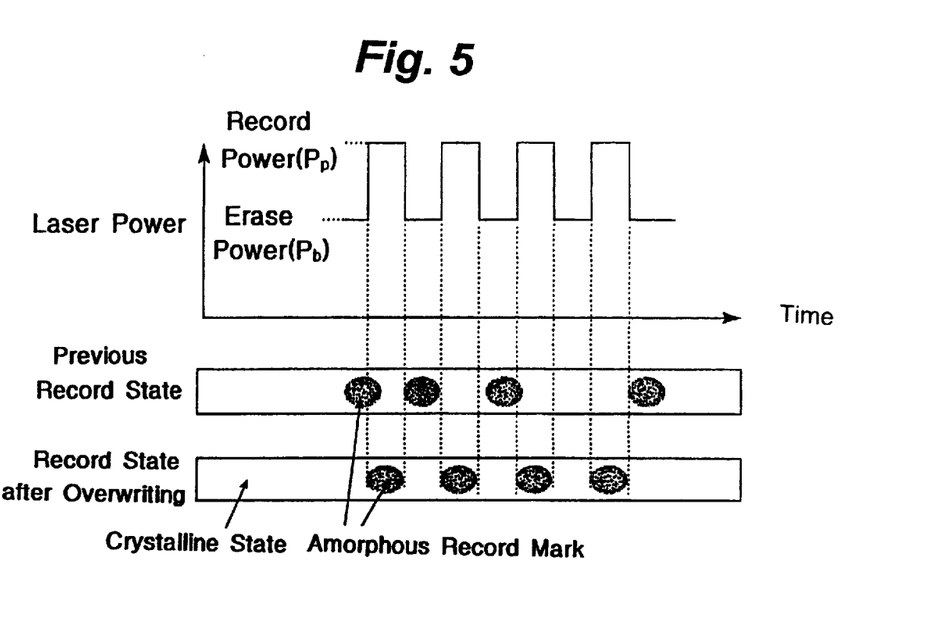
FIG. 5 provides a schematic diagram of the overwriting process in a phase change optical disk.

FIG. 5 shows the overwriting process of the phase change optical disk of the present invention. When a high power laser beam is irradiated on an area of the recording layer, the irradiated area melts and the molten area is cooled rapidly to form an amorphous area, i.e., a record mark. The record mark can be erased through recrystallizing the record area by way of irradiating the record area with a laser beam having a power corresponding to ⅓ to ½ of the recording power. A laser beam having a multi-pulse configuration consisting of a number of continuous short pulses is preferred.

The present invention is further described and illustrated in Examples, which are, however, not intended to limit the scope of the present invention.

CD-Rws

The properties of the CD double speed phase change optical disks prepared in Examples 1 to 14 and Comparative Examples 1 to 14 were evaluated according to the following methods.

(1) Corrosion Resistance(Accelerated Aging Test)

A sample disk was kept at 25–85° C., 50–95% of relative humidity for 100 hours, and its recording and playing properties were evaluated(good:O, poor:X).

(2) Recording Properties

Figure 6:
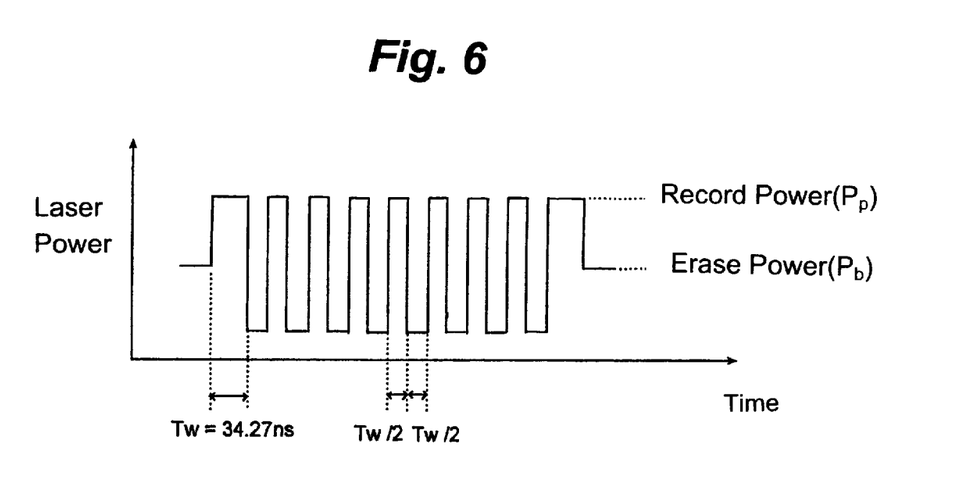
FIG. 6 exemplifies the multi-pulse configuration of the laser beam used in the Examples of the present invention.

The recording properties of a disk was evaluated with a dynamic property evaluating equipment for CD-RW(APEX Co., Modular Media Tester (MMT). A laser beam having the multi-pulse configuration shown in FIG. 6 was used. The recording power and the erase power were 12,5 mW and 6.25 mW, respectively. The wavelength of the light source was 780 nm and NA of object lens was 0.55.

The initial recording property was represented by the jitter value after an initial recording. The recording signal property was considered to be poor when the jitter value exceeded 20 ns.

The overwrite recording property, represented by the jitter value after 10th overwriting, was considered to be poor when the jitter value exceeded 20 ns(good:O, poor:X).

The overwrite cyclability means the number of overwriting cycles achievable until the jitter value reaches a point which is 50% greater than the overwrite jitter value after 10th overwriting.

formed on the first dielectric layer in a thickness of 200 Å. Then, a ZnS—$SiO_2$ (8:2) second dielectric layer having a thickness of 250 Å was formed thereon by RF sputtering.

An Al—Ti(Al 98.5 wt %, Ti 1.5 wt %) first reflection layer having a thickness of 50 Å was formed on the second dielectric layer, and then, an Ag second reflection layer having a thickness of 500 Å was formed on the first reflection layer.

A UV-curable resin(SD 17:DIC) was spin-coated on the second reflection layer as a protection layer.

The resulting phase change optical disk was initialized by irradiating the recording layer with a semi-conductor laser beam(wavelength 830 nm) using a high speed initializing equipment(POP-120, Hitachi Co.)

The properties of the disk thus prepared are shown in Table I.

EXAMPLES 2 to 5

The procedure of Example 1 was repeated except that the constituents and/or the thickness of the reflection layers were varied as shown in Table I.

The properties of the disks thus prepared are shown in Table I.

COMPARATIVE EXAMPLES 1 to 14

The procedure of Example was repeated except that the constituents and/or the thickness of the reflection layers were varied as shown in Table I.

The properties of the disks thus prepared are shown in Table I.

TABLE I

|  | 1st(or single) reflection layer | | 2nd reflection layer | | Corrosion | overwrite | initial jitter |
| --- | --- | --- | --- | --- | --- | --- | --- |
|  | material | thickness(Å) | material | thickness(Å) | Resistance | property | (ns) |
| Ex. 1 | Al—Ti | 50 | Ag | 500 | O | O | 12 |
| Ex. 2 | Al—Ti | 30 | Ag | 500 | O | O | 12 |
| Ex. 3 | Al—Ti | 10 | Ag | 500 | O | O | 12 |
| Ex. 4 | Al—Ti | 10 | Ag | 250 | O | O | 13 |
| Ex. 5 | Al—Ti | 100 | Ag | 400 | O | O | 14 |
| Comp. Ex. 1 | Ag | 1000 | — | — | O | O | 21 |
| Comp. Ex. 2 | Ag | 750 | — | — | O | O | 19 |
| Comp. Ex. 3 | Ag | 500 | — | — | X | O | 15 |
| Comp. Ex. 4 | Ag | 300 | — | — | X | O | 18 |
| Comp. Ex. 5 | Ag | 250 | — | — | X | O | 19 |
| Comp. Ex. 6 | Ag | 200 | — | — | X | X | 34 |
| Comp. Ex. 7 | Ag | 150 | — | — | X | — | — |
| Comp. Ex. 8 | Al—Ti | 1500 | — | — | O | O | 19 |
| Comp. Ex. 9 | Al—Ti | 1000 | — | — | O | O | 19 |
| Comp. Ex. 10 | Al—Ti | 750 | — | — | O | X | 23 |
| Comp. Ex. 11 | Al—Ti | 500 | — | — | O | — | — |
| Comp. Ex. 12 | Al—Ti | 300 | — | — | O | — | — |
| Comp. Ex. 13 | Al—Ti | 10 | Ag | 200 | O | X | 21 |
| Comp. Ex. 14 | Cu | 10 | Ag | 200 | O | X | 23 |

Example 1

A 1.2 mm thick polycarbonate disk substrate having 500 Å deep spiral grooves was prepared using a stamper in accordance with an injection molding method.

A ZnS—$SiO_2$(8:2) first dielectric layer having a thickness of 950 Å was formed on the grooves using an RF sputtering method. Then, an Ag—In—Sb—Te alloy thin layer was As can be seen in Table I, the inventive phase change optical disks prepared in Examples 1–5 exhibit good overwrite recording property and corrosion resistance as well as low initial recording jitter values below 15 ns.

The disks prepared in Comparative Examples 1 and 2 which comprise an Ag single reflection layer having a thickness of 750 Å or more exhibit good corrosion resistance but the use of such a thick silver layer is not economically feasible. When the thickness of the Ag single reflection layer is reduced to below 500 Å, the corrosion resistance becomes poor. In case the thickness of the Ag single reflection layer is less than 200 Å (Comparative Examples 6 and 7), the disks exhibit poor recording properties, besides the corrosion problem.

Figure 7:
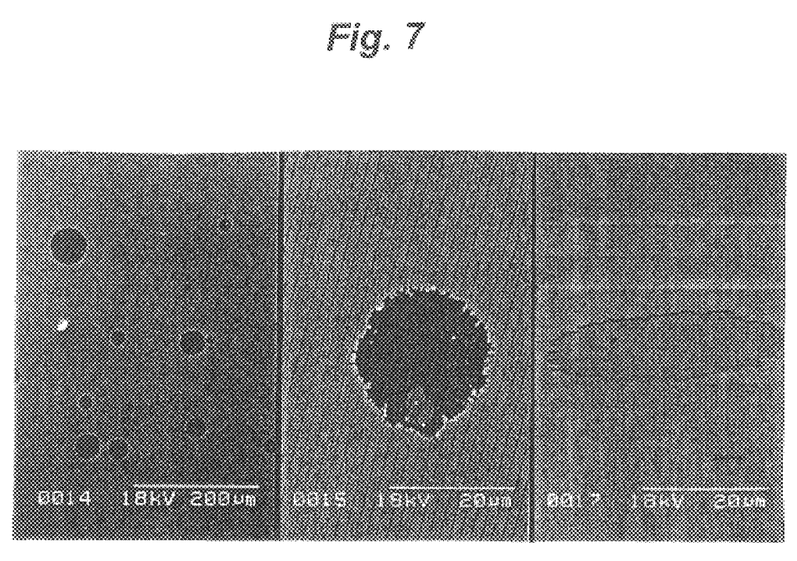
FIG. 7 exhibits an SEM photograph of the corrosion surface of an Ag reflection layer generated in an accelerated aging test.

FIG. 7 depicts an SEM photograph of the corrosion surface of an Ag reflection layer of disk of comparative Example 3 obtained in an accelerated aging test.

Regarding the disks containing a single Al—Ti reflection layer, when the thickness of the Al—Ti reflection layer is 1000 Å or more (Comparative Examples 8 and 9), the corrosion resistance and overwrite property are satisfactory, but, the initial jitter values are higher than those of the inventive disks. Also, the process for producing such a thick Al—Ti layer has the problem of low producibility.

As the thickness of the Al—Ti reflection layer was reduced to 750, 500 and 300 Å (Comparative Examples 10 to 12), the recording signal properties deteriorate.

melting point, and if the cooling rate is not sufficiently high, the molten layer tends to crystallized before being quenched as an amorphous phase. The disks having a single Al alloy reflection layer of less than 750 Å thickness have such a problem of insufficient cooling rate, and accordingly, have poor recording properties.

Thus, the use of a conventional Al—Ti alloy single reflection layer requires that it has a thickness of 1000 Å or more, while a Ag single reflection layer of less than 500 Å thickness suffers from the problem of corrosion. In contrast, the thin disk of the present invention having a relatively thin layer exhibits improved properties.

EXAMPLES 6 to 14

The procedure of Example 1 was repeated except that the constituents and the thickness of the reflection layers were varied as shown in Table III.

The properties of the disks thus prepared are shown in Table III.

TABLE III

| | 1st(or single) reflection layer | | 2nd reflection layer | | Corrosion Resistance | overwrite property | initial jitter (ns) | overwrite cyclability |
|---|---|---|---|---|---|---|---|---|
| | material | thickness(Å) | material | thickness(Å) | | | | |
| Ex. 6 | Al—Ti | 500 | Ag | 500 | ○ | ○ | 19 | >2,000 |
| Ex. 7 | Al—Ti | 400 | Ag | 500 | ○ | ○ | 18 | >2,000 |
| Ex. 8 | Al—Ti | 300 | Ag | 500 | ○ | ○ | 19 | >2,000 |
| Ex. 9 | Al—Ti | 200 | Ag | 500 | ○ | ○ | 18 | >2,000 |
| Ex. 10 | Al—Ti | 100 | Ag | 500 | ○ | ○ | 18 | >1,800 |
| Ex. 11 | Al—Ti | 100 | Ag | 450 | ○ | ○ | 14 | >900 |
| Ex. 12 | W | 100 | Ag | 500 | ○ | ○ | 18 | >2,000 |
| Ex. 13 | W | 500 | Ag | 500 | ○ | ○ | 18 | >2,000 |
| Ex. 14 | Si | 100 | Ag | 500 | ○ | ○ | 18 | >1,100 |

Figure 8:
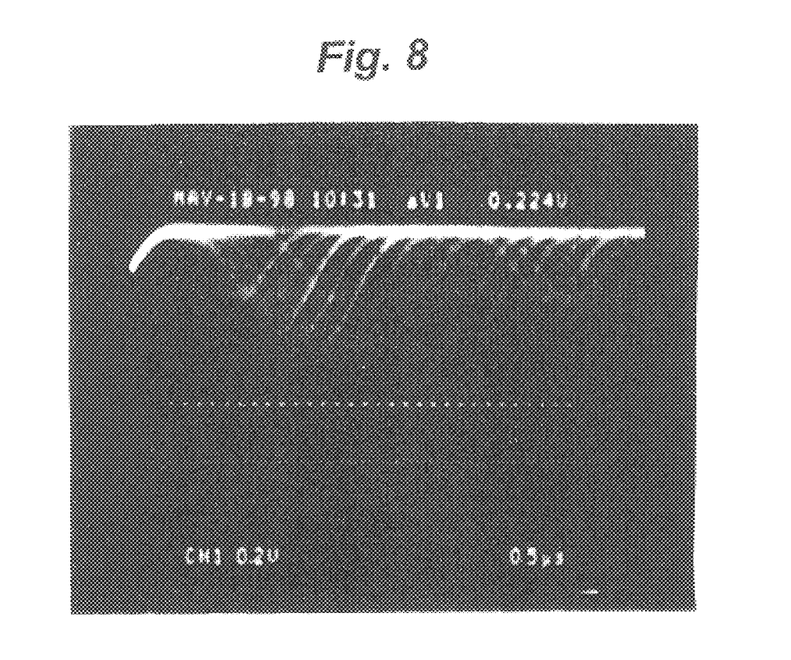
FIG. 8 pictorializes the wave pattern of the played signals of the phase change disk prepared in Comparative Example 10, wherein a single Al—Ti reflection layer having a thickness of 750 Å is employed.
Figure 9:
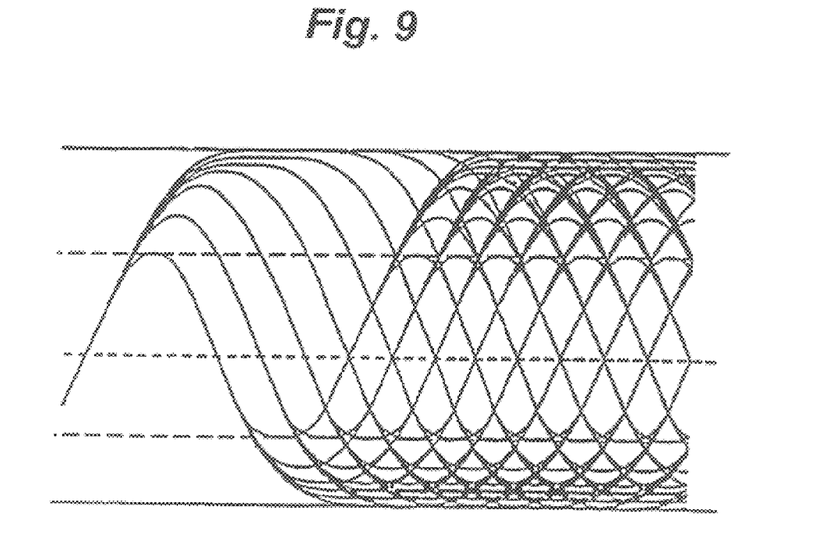
FIG. 9 describes an ideal wave pattern estimated for the played signals, corresponding to FIG. 8.

FIG. 8 shows the wave pattern of played signals of the phase change disk prepared in Comparative Example 10 employing a single 750 Å Al—Ti reflection layer. Due to the presence of imperfect amorphous marks on the disk, the wave pattern shown in FIG. 8 is different from that of FIG. 9 which exhibits an ideal wave pattern.

Figure 10:
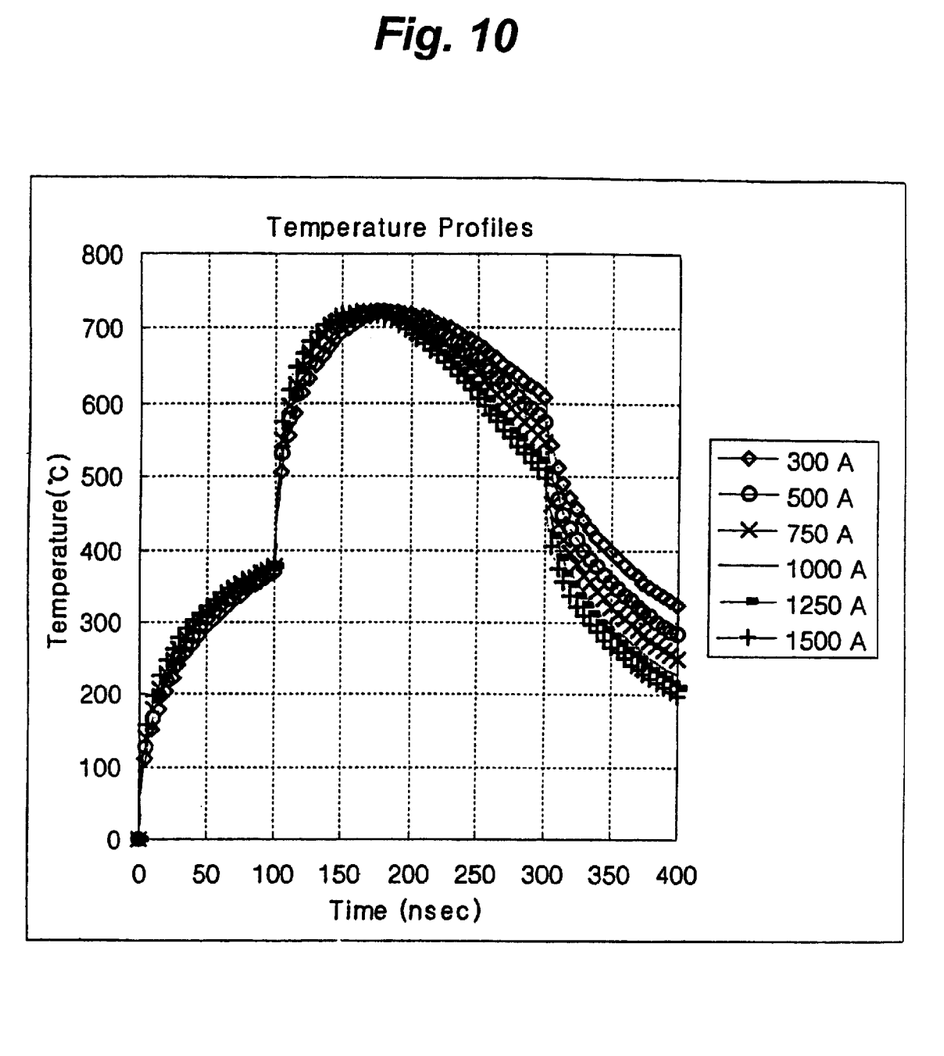
FIG. 10 demonstrates simulated heating-cooling behaviors of the disks of Comparative Examples containing a single Al—Ti reflection layer of various thickness.

Shown in FIG. 10 are simulated heating-cooling behavior curves of the disks prepared in Comparative Examples 8 to 12 employing a single Al—Ti reflection layer of various thickness. The physical properties and optical constants of the materials used in the simulation are shown in Table II.

TABLE II

| | Material | Refractive Index (780 nm) | Thermal Conductivity (J/cm/sec/° C.) | Specific Heat |
|---|---|---|---|---|
| Dielectric Layer | ZnS-SiO$_2$ | 2.05 + 0.001i | 0.006 | 2.055 |
| Recording Layer | Ag-In-Sb-Te | 4.13 + 4.68i | 0.0055 | 1.292 |
| Reflecting Layer | Al-Ti | 2.54 + 7.82i | 1.1 | 2.464 |

As can ben seen in FIG. 10, the cooling rate becomes lower as the thickness of the Al alloy refection layer decreases.

An amorphous record mark is generally created by bringing the temperature of the recording layer above its melting point and rapidly cooling the molten layer to below the As can be seen in Table III, the inventive phase change optical disks prepared in Examples 6–14 exhibit good record signal properties, corrosion resistance and excellent overwrite cyclability.

Figure 11:
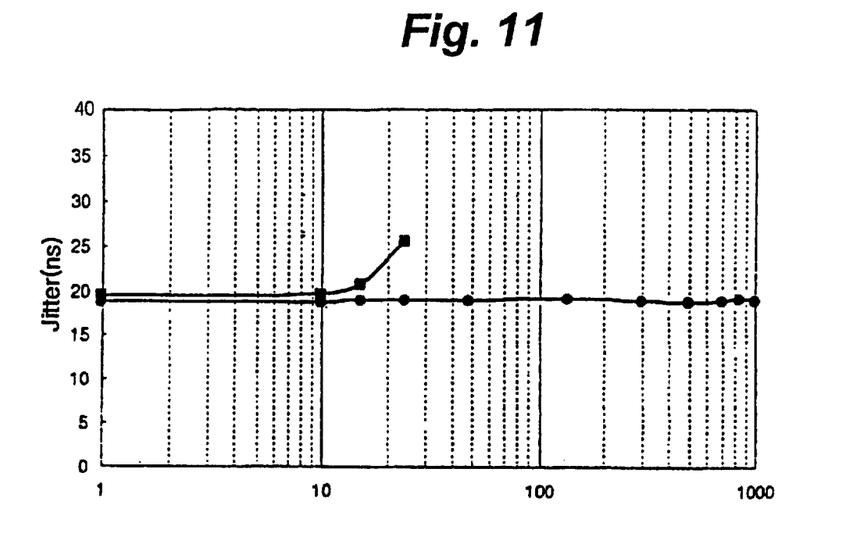
FIG. 11 records accelerated aging test results for the phase change disk having an Ag single reflection layer(■) and the disk prepared in Example 10 having an Al—Ti first reflection layer and an Ag second reflection layer(●)

FIG. 11 depicts the accelerated aging test results obtained for the phase change disk prepared in Comparative Example 3 employing Ag single reflection layer(■) and the disk prepared in Example 10 having a first Al—Ti reflection layer and an Ag second reflection layer(●). The disk of the present invention exhibits a constant jitter value whereas the jitter value of the disk having a single Ag layer abruptly increases after 10 hours.

DVD-RAMs

The properties of the DVD-RAM disks prepared in Examples 15 to 20 and Comparative Examples 15 to 18 were evaluated by the following methods.

A disk was loaded on a dynamic property evaluating equipment for DVD-RAM(Nakamichi Co.) and the properties thereof were evaluated under a spinning speed of 6.0 ms/s. A laser beam was used in accordance with the DVD-RAM standard 1.0(DVD Forum). The wavelength of the light source was 680 nm and NA of object lens was 0.60.

The overwrite jitter was defined as the jitter value after 10th overwriting and considered to be poor when the jitter value exceeds 4 ns.

The overwrite cyclability is represented by the number of overwriting cycles achievable until the jitter value reaches a point which is 50% higher than the overwrite jitter.

$P_p$(mW) represents the recording power. The overall property of a disk is classified as good when the overwrite jitter value is less than 4.0 ns and overwrite cyclability exceeds 100,000 cycles(good:O, poor:X).

EXAMPLE 15

A 0.6 mm thick polycarbonate disk substrate having 70 nm deep spiral grooves was prepared using a stamper in accordance with an injection molding method. The distance between two adjacent grooves was 1.48 μm and the distance between the center of a groove and the center of an adjoining land was 0.74 μm. Along the centerline of the grooves, header pits were formatted to detect the address of each sector. Further, a flexion was formed in each groove so that Wobble signals of same frequency number could be detected.

A ZnS—SiO$_2$(8:2) first dielectric layer having a thickness of 950 Å was formed on the grooves using an RF sputtering method. A Ge—Sb—Te alloy thin layer was formed on the first dielectric layer in a thickness of 200 Å. Then, a ZnS—Si$_2$ (8:2) second dielectric layer having a thickness of 140 Å was formed thereon by RF sputtering method.

An Al—Cr(Al 98 at %, 2 at %) first reflection layer having a thickness of 500 Å was formed on the second dielectric layer by RF sputtering. Finally, a Cu second reflection layer having a thickness of 400 Å was formed on the first reflection layer by using a DC sputtering method. A UV-curable resin(SD 17:DIC) was spin-coated as a protection layer.

The properties of the disk thus prepared are shown in Table IV.

EXAMPLES 16 to 19

The procedure of Example 15 was repeated except that the constituents and the thickness of the reflection layers were varied as shown in Table IV.

The properties of the disks thus prepared are shown in Table IV.

COMPARATIVE EXAMPLES 15 to 21

The procedure of Example 15 was repeated except that the constituents and the thickness of the reflection layers were varied as shown in Table IV.

The properties of the disks thus prepared are shown in Table IV.

As can be seen in Table IV, the inventive phase change optical disks prepared in Examples 15 to 19 exhibit good record signal properties and corrosion resistance as well as low initial recording jitter values.

Figure 12:
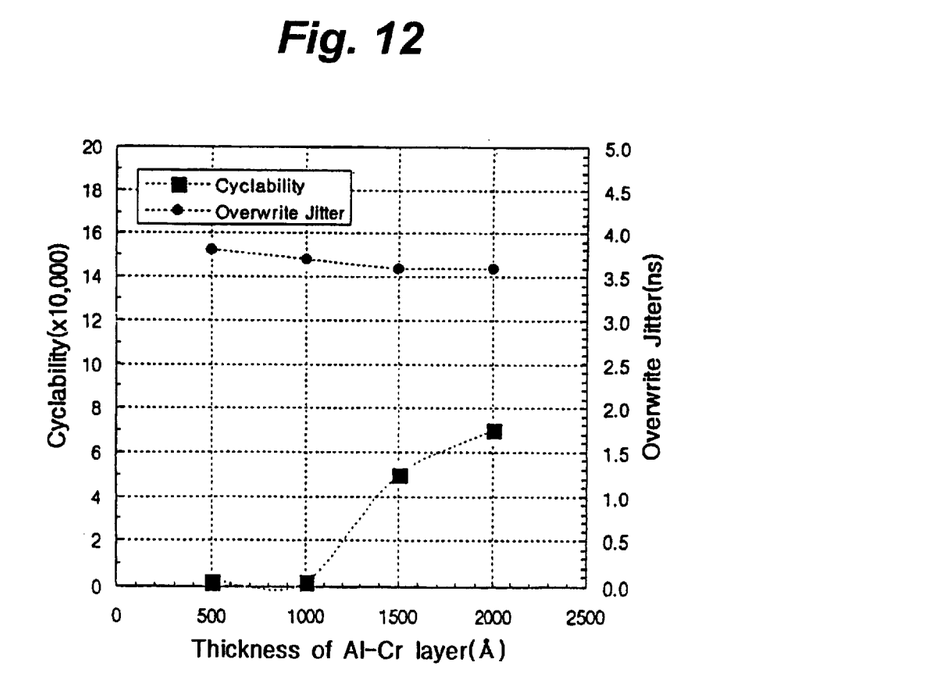
FIG. 12 explains the changes of overwrite jitter value and cyclability as function of the thickness of the Al—Cr single reflection layer employed in the disks of Comparative Examples 15 to 18.

FIG. 12 shows the changes of the overwrite jitter value and cyclability of the disks of Comparative Examples 15 to 18 with the thickness of the Al—Cr single reflection layer. As shown in FIG. 12, even when the thickness of the Al—Cr layer is as high as 2000 Å, the overwrite cyclability reaches only 70,000.

Figure 13:
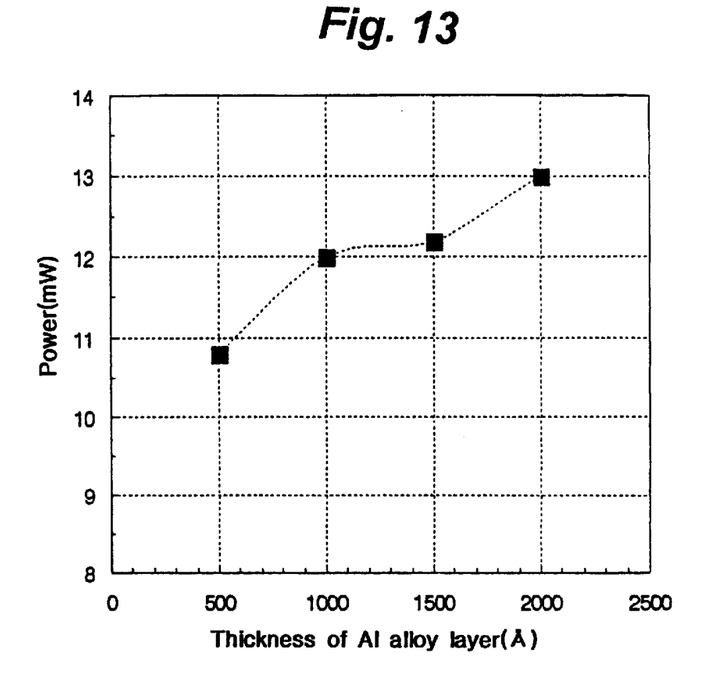
FIG. 13 indicates the dependency of the recording power on the thickness of the Al—Cr single reflection layer employed in the disks of Comparative Examples 15 to 18.

FIG. 13 shows the change of the recording power of the disks of Comparative Examples 15 to 18 with the thickness of the Al—Cr single reflection layer. As can be seen in FIG. 13, as the thickness of the reflection layer increases, the recording power must be elevated to an undesirable level. Further, when an excessively thick reflection layer is used in the production of a disk, the process becomes uneconomical due to increased material cost and low producibility. Further, when the combined thickness of the Al—Cr and Cu reflection layers is larger than a prescribed limit of 1300 Å as in Comparative Examples 19 to 21, one obtains disks having high overwrite jitter values and poor overwrite cyclability.

Figure 14:
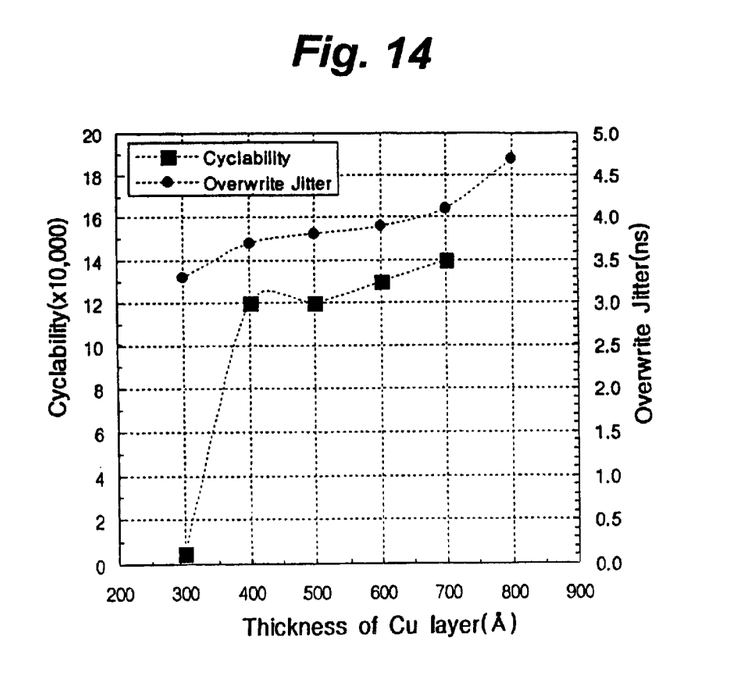
FIG. 14 highlights the changes of overwrite jitter value and cyclability as function of the thickness of the Cu second reflection layer used in the disks of Examples 15 to 19 and Comparative Example 19.

FIG. 14 depicts the changes of overwrite jitter value and cyclability with the thickness of the Cu second reflection layer.

EXAMPLE 20

The procedure of Example 15 was repeated except that the constituent of the recording layer was GeSb$_2$Te$_4$; an Al—Cr alloy (Cr 2.0 at %) layer had a thickness of 500 Å and a Cu layer having a thickness of 100 Å were used as the first and second reflection layers, respectively; and header pit and wobble were not formed on the substrate.

COMPARATIVE EXAMPLE 22

The procedure of Example 20 was repeated except that an Al—Cr alloy layer having a thickness of 500 Å was used+ as a single reflection layer.

COMPARATIVE EXAMPLE 23

The procedure of Example 20 was repeated except that the thickness of the second Cu reflection layer was 200 Å.

The disks prepared in Example 20 and Comparative Examples 22 and 23 were recorded under the condition of

TABLE IV

| | 1st(or single) reflection layer | | 2nd reflection layer | | Overwrite jitter (ns) | Overwrite cyclability | P$_p$ (mW) | A* |
|---|---|---|---|---|---|---|---|---|
| | material | thickness(Å) | material | thickness(Å) | | | | |
| Ex. 15 | Al—Cr | 500 | Cu | 400 | 3.7 | 120,000 | 12.0 | ○ |
| Ex. 16 | Al—Cr | 500 | Cu | 500 | 3.8 | 120,000 | 12.6 | ○ |
| Ex. 17 | Al—Cr | 500 | Cu | 600 | 3.9 | 130,000 | 12.6 | ○ |
| Ex. 18 | Al—Cr | 1000 | Cu | 500 | 3.7 | 100,000 | 13.1 | ○ |
| Ex. 19 | Al—Cr | 500 | Cu | 700 | 4.0 | 140,000 | 12.6 | ○ |
| Comp. Ex. 15 | Al—Cr | 500 | — | — | 3.8 | 2,000 | 10.8 | X |
| Comp. Ex. 16 | Al—Cr | 1000 | — | — | 3.7 | 2,000 | 12.0 | X |
| Comp. Ex. 17 | Al—Cr | 1500 | — | — | 3.6 | 50,000 | 12.2 | X |
| Comp. Ex. 18 | Al—Cr | 2000 | — | — | 3.6 | 70,000 | 13.0 | X |
| Comp. Ex. 19 | Al—Cr | 500 | Cu | 800 | 4.7 | — | 12.6 | X |
| Comp. Ex. 20 | Al—Cr | 500 | Cu | 1000 | 4.6 | — | 12.8 | X |
| Comp. Ex. 21 | Al—Cr | 1500 | Cu | 500 | 3.8 | 50,000 | 12.2 | X | note:
A = overall property

Figure 15:
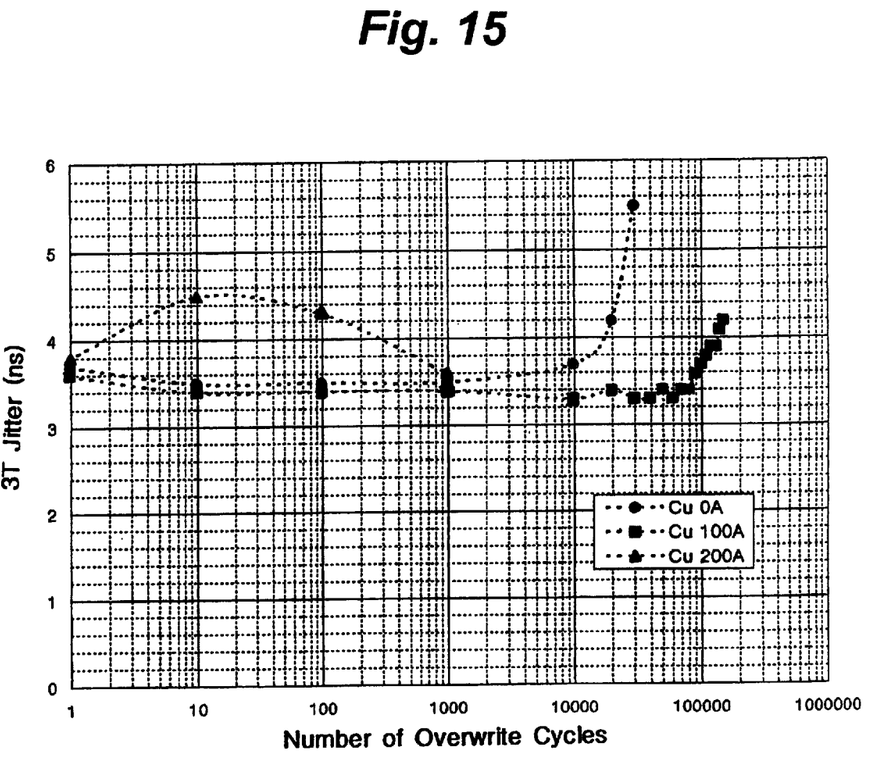
FIG. 15 signifies the dependency of the jitter values of the phase change optical disks prepared in Example 20(■) and Comparative Examples 22(●) and 23(▲) on the number of rewriting cycles.

Example 12 except that the speed was adjusted to 8.2 m/s. FIG. 15 shows the changes of overwrite jitter values(3Tw) of the phase change optical disks prepared in Example 20 (■) and Comparative Examples 22(●) and 23(▲) as function of the number of overwrite cycles.

As can be seen from the above results, the thin Cu layer having a thickness of 100 Å (Example 20) exhibits better properties than the 200 Å thick Cu layer employed in Comparative Example 23 when under the condition examined.

Therefore, the phase change optical disk of the present invention may be advantageously applied to CD-RWs, DVD-RAMs, and the like.

While the embodiments of the subject invention have been described and illustrated, it is obvious that various changes and modifications can be made therein without departing from the spirit of the present invention which should be limited only by the scope of the appended claims.

What is claimed is:

1. A phase change optical disk containing a first dielectric layer, a recording layer, a second dielectric layer, a reflection layer and a protection layer, characterized in that the reflection layer comprises a first reflection layer made of a metal selected from the group consisting of Al, Au, W, Mo, Ni, Ge, Si, Pd, Sn, Rh and Pt, or an alloy thereof and a second reflection layer made of Cu, Ag or an alloy thereof, the first reflection layer being in closed contact with the second dielectric layer, and the second reflection layer, with the first reflection layer and the protection layer.

2. The phase change optical disk of claim 1, wherein the alloy contains a metallic component selected from the group consisting of Al, Au, Cn, Ag, W, Mo, Ni, Ge, Si, Fe, Cr, Co, Zr, Zn, Ti, Ta, Mg, Pd, V, Nb, Hf, Sn, Sc, Rh, Pt, Mn and a combination thereof, as a minor component.

3. The phase change optical disk of claim 1, wherein the alloy which constitutes the second reflection layer contains a metallic component selected from the group consisting of Al, Au, Cu, Ag, W, Mo, Ni, Ge, Si, Fe, Cr, Co, Zr, Zn, Ti, Ta, Mg, Pd, V, Nb, Hf, Sn, Sc, Rh, Pt, Mn and a combination thereof, as a minor component.

4. The phase change optical disk of claim 1, wherein the recording layer is of an Ag—In—Sb—Te alloy, the first reflection layer is of W, Si, or an Al alloy, having a thickness of 10 Å or more and the second reflection layer is of Ag or an Ag alloy, having a thickness of 250 Å or more.

5. The phase change optical disk of claim 4, wherein the first reflection layer is of an Al alloy, having a thickness of 100 Å or more and the second reflection layer is of Ag or an Ag alloy, having a thickness of 450 Å or more.

6. The phase change optical disk of claim 1, wherein the recording layer is of Ge—Sb—Te alloy, the first reflection layer is of Al or an Al alloy and the second reflection layer is of Cu or Ag.

7. The phase change optical disk of claim 6, wherein the combined thickness of the first reflection layer and the second reflection layer is 2000 Å or less.

8. The phase change optical disk of claim 7, wherein the thickness of the first reflection layer is 1300 Å or less and that of the second reflection layer is 10 Å or more.

9. The phase change optical disk of claim 8, wherein the thickness of the second reflection layer is 800 Å or less.

* * * * *